(12) United States Patent
Naidoo et al.

(10) Patent No.: US 10,678,224 B2
(45) Date of Patent: Jun. 9, 2020

(54) LOOP INTERFACE

(71) Applicant: FISHER-ROSEMOUNT SYSTEMS, INC., Round Rock, TX (US)

(72) Inventors: Julian K. Naidoo, Cedar Park, TX (US); Gary K. Law, Georgetown, TX (US); Godfrey R. Sherriff, Austin, TX (US); Daniel R. Strinden, Austin, TX (US); Cristopher Ian Sarmiento Uy, Metro Manila (PH); Prashant Joshi, Leicester (GB)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 263 days.

(21) Appl. No.: 15/629,390

(22) Filed: Jun. 21, 2017

(65) Prior Publication Data

US 2018/0373229 A1 Dec. 27, 2018

(51) Int. Cl.
*G05B 19/41* (2006.01)
*G05B 23/02* (2006.01)
*G05B 19/418* (2006.01)
*H04L 29/08* (2006.01)

(52) U.S. Cl.
CPC ..... *G05B 19/4185* (2013.01); *G05B 23/0221* (2013.01); *H04L 67/12* (2013.01); *G05B 2219/33106* (2013.01)

(58) Field of Classification Search
None
See application file for complete search history.

(56) References Cited

U.S. PATENT DOCUMENTS

| 6,510,353 | B1 * | 1/2003 | Gudaz | G05B 19/0428 |
| | | | | 700/37 |
| 6,615,090 | B1 * | 9/2003 | Blevins | G05B 23/0227 |
| | | | | 700/19 |
| 7,971,151 | B2 | 6/2011 | Nixon et al. | |
| 10,386,824 | B2 * | 8/2019 | Jundt | G05B 19/4185 |

(Continued)

FOREIGN PATENT DOCUMENTS

| GB | 2 476 145 A | 6/2011 |
| GB | 2 512 985 A | 10/2014 |

OTHER PUBLICATIONS

Search Report for Application No. PGB1808670.2, dated Jan. 15, 2019.

(Continued)

*Primary Examiner* — Mohammad Ali
*Assistant Examiner* — Kelvin Booker
(74) *Attorney, Agent, or Firm* — Marshall, Gerstein & Borun LLP

(57) ABSTRACT

The described methods and systems give users situational awareness regarding control loops in a process control system. The user can utilize the loop interface described herein to quickly understand how a given element (e.g., a device or function block) relates to other elements of the control loop. This enables the user to appreciate how modifying a parameter or device, for example, may impact control of the process. The user need not be intimately familiar with the logic associated with a control loop to understand the status of the control loop and its constituent elements. Further, in an embodiment, the user can easily correct certain statuses (e.g., unusual conditions) that arise with respect to the control loop.

24 Claims, 11 Drawing Sheets

(56) References Cited

U.S. PATENT DOCUMENTS

| | | | | |
|---|---|---|---|---|
| 10,386,825 B2* | 8/2019 | Jundt | | G05B 19/4185 |
| 2002/0054107 A1* | 5/2002 | Paunonen | | G05B 23/0272 |
| | | | | 715/764 |
| 2002/0077711 A1* | 6/2002 | Nixon | | C10G 11/187 |
| | | | | 700/51 |
| 2003/0028268 A1* | 2/2003 | Eryurek | | G05B 17/02 |
| | | | | 700/73 |
| 2004/0075689 A1* | 4/2004 | Schleiss | | G05B 15/02 |
| | | | | 715/771 |
| 2004/0158474 A1* | 8/2004 | Karschnia | | G05B 19/4185 |
| | | | | 379/29.01 |
| 2004/0186927 A1* | 9/2004 | Eryurek | | G05B 15/02 |
| | | | | 710/12 |
| 2004/0225383 A1* | 11/2004 | Tsai | | G05B 13/0265 |
| | | | | 700/29 |
| 2005/0096872 A1* | 5/2005 | Blevins | | G05B 17/02 |
| | | | | 702/183 |
| 2005/0197803 A1* | 9/2005 | Eryurek | | G05B 23/0289 |
| | | | | 702/185 |
| 2005/0197805 A1* | 9/2005 | Eryurek | | G05B 23/0272 |
| | | | | 702/188 |
| 2005/0197806 A1* | 9/2005 | Eryurek | | G05B 23/0221 |
| | | | | 702/188 |
| 2006/0020423 A1* | 1/2006 | Sharpe, Jr. | | C10G 11/187 |
| | | | | 702/183 |
| 2007/0067142 A1* | 3/2007 | Kavaklioglu | | G06F 3/0482 |
| | | | | 702/182 |
| 2007/0067725 A1* | 3/2007 | Cahill | | G05B 23/027 |
| | | | | 715/733 |
| 2007/0150079 A1* | 6/2007 | Blevins | | G05B 23/0251 |
| | | | | 700/41 |
| 2007/0168057 A1* | 7/2007 | Blevins | | G05B 13/022 |
| | | | | 700/53 |
| 2008/0082180 A1* | 4/2008 | Blevins | | G05B 11/42 |
| | | | | 700/29 |
| 2008/0125877 A1* | 5/2008 | Miller | | G05B 15/02 |
| | | | | 700/29 |
| 2008/0188972 A1* | 8/2008 | Miller | | G05B 19/4184 |
| | | | | 700/110 |
| 2009/0065578 A1* | 3/2009 | Peterson | | G05B 19/048 |
| | | | | 235/382 |
| 2009/0077055 A1 | 3/2009 | Dillon et al. | | |
| 2009/0112335 A1* | 4/2009 | Mehta | | G05B 13/048 |
| | | | | 700/29 |
| 2012/0230309 A1* | 9/2012 | Junk | | G05B 19/4186 |
| | | | | 370/338 |
| 2012/0290104 A1* | 11/2012 | Holt | | G06Q 10/00 |
| | | | | 700/29 |
| 2015/0094988 A1* | 4/2015 | Schumacher | | G01M 99/00 |
| | | | | 702/188 |
| 2015/0192907 A1* | 7/2015 | Blevins | | G05B 17/02 |
| | | | | 700/11 |
| 2015/0193418 A1* | 7/2015 | Koska | | H04L 67/10 |
| | | | | 715/223 |
| 2017/0031327 A1* | 2/2017 | Verma | | H04L 49/30 |
| 2017/0102678 A1* | 4/2017 | Nixon | | G05B 17/02 |
| 2017/0102693 A1* | 4/2017 | Kidd | | G05B 19/41865 |
| 2017/0102694 A1* | 4/2017 | Enver | | G05B 19/41875 |
| 2017/0102696 A1* | 4/2017 | Bell | | G05B 23/0275 |
| 2017/0103103 A1* | 4/2017 | Nixon | | G06F 16/256 |
| 2018/0017952 A1* | 1/2018 | Jundt | | G05B 15/02 |
| 2018/0088541 A1* | 3/2018 | Sangi | | H04W 4/70 |
| 2018/0101152 A1* | 4/2018 | Jundt | | G05B 19/041 |
| 2018/0113442 A1* | 4/2018 | Nixon | | G05B 19/4184 |

OTHER PUBLICATIONS

Modeling and Control Dynamic World of Process Control, "Override Control." Retrieved from the Internet at <http://modelingandcontrol.com/2011/02/override_control/> (Sep. 21, 2017).

Iam, "Limit, Selector, and Override Controls." Retrieved from the internet at <http://iamechatronics.com/notes/lessons-in-instrumentation/477-limit-selector-and-override-control> (Sep. 21, 2017).

Control Engineering, "Noise and Disturbances in Process Control." Retrieved from the internet at <http://www.controleng.com/single-article/noise-and-disturbances-in-process-control/74cf2df72f9ec5abc26305ea93846554.html> (Sep. 21, 2017).

* cited by examiner

LOOP INTERFACE

FIELD OF THE DISCLOSURE

The present disclosure relates to a process control system interface for monitoring, interacting with, and controlling a process control system, and in particular, to an interface for viewing the status of a control loop in a process control system.

BACKGROUND

Distributed process control systems, like those used in chemical, petroleum, or other processes, typically include one or more process controllers and input/output (I/O) devices communicatively coupled to at least one host or operator workstation and to one or more field devices via analog, digital or combined analog/digital buses, or via a wireless communication link or network.

The field devices, which may be, for example, valves, valve positioners, switches, and transmitters (e.g., including temperature, pressure, level, and flow rate sensors), are located within the process environment and generally perform physical or process control functions, such as opening or closing valves, or measuring process parameters to control one or more processes executing within the process plant or system. Smart field devices, such as field devices conforming to the well-known Fieldbus protocol, may also perform control calculations, alarming functions, and other control functions commonly implemented within a process controller.

The process controllers (sometimes simply referred to as "controllers"), which are also typically located within the plant environment, receive signals indicative of process measurements made by field devices and/or other information pertaining to the field devices and execute a controller application that runs, for example, different control modules that make process control decisions, generate control signals based on the received information, and coordinate with the control modules or blocks being performed in the field devices, such as HART®, Wireless HART®, and FOUNDATION® Fieldbus field devices. The control modules in the process controller send the control signals over the communication lines or links to the field devices to control the operation of at least a portion of the process plant or system.

The particular arrangement of field devices, process controllers, control modules, and various other hardware and software elements utilized to control a particular process output may be referred to as a "control loop." For example, a control loop for controlling a water level in a tank may include: (i) a level transmitter in a tank configured to measure the tank's water level; (ii) a process controller coupled to the level transmitter (e.g., via an I/O device) and configured to receive a level measurement obtained by the level transmitter; and (iii) a water inlet valve coupled to the process controller and configured to open or close based on control signals received from the process controller. A control loop may further include control modules (stored and/or executed by process controllers and/or field devices) configured to generate control signals based on an internal logic and one or more received measurements. For example, the control loop for controlling the water level may include control modules, stored and executed at the process controller, for generating control signals to open or close the water inlet valve based on the level measurements received from the level transmitter. A process plant may include hundreds or thousands of control loops for controlling various process outputs (e.g., tank levels, flow rates, temperatures, pressures, etc.).

Various plant personnel, such as configuration engineers, operators, and technicians, may interact with a control loop in a process plant. Generally speaking, configuration engineers create the control modules that are downloaded to the process controllers in the control loops. Operators monitor various variables in control loops and may set or change settings affecting run-time operation of the control loop (e.g., by adjusting set-points). Technicians and maintenance personnel may service devices in the field (e.g., process controllers and field devices), which may require taking the devices off-line.

Unfortunately, plant personnel often struggle to evaluate the condition or status of a control loop because plant personnel often must go through multiple menus, screens, and parameter lists of multiple function blocks in the control loop, for example, to appreciate the overall condition of the control loop. Moreover, even if plant personnel can somehow get a complete picture of the overall condition or status of the control loop, he or she may not fully appreciate how interactions with control loop devices and parameters affect other devices and parameters in the control loop. This difficultly with evaluating how interactions with a particular element of a control loop will affect other elements of the control loop can be attributed, at least in part, to the fact that plant personnel often have an unclear or incomplete idea of the structure (both logical and physical) of the control loop, or may not immediately be able to recall the entire loop, particularly if the control loop is complex in nature.

For example, configuration engineers may not readily recall how a new control module will affect parameters and field devices in the control loop. As another example, operators may not appreciate how changing a set-point or ignoring an alarm will affect other parameters or field devices in the control loop. Further, an operator may struggle to evaluate the status of a control loop because the elements of the control loop may have errors or conditions that are difficult to identify, and may not have a clear idea of which devices and control modules are included in a given control loop.

As yet another example, technicians and maintenance personnel may not always be aware of the impact their activities with respect to one or more devices in a control loop have on other devices in the control loop or in related loops. Specifically, a technician may not understand how the measurement or control devices being adjusted, replaced, taken off-line, etc. may affect the rest of the process. To the extent that maintenance personnel currently rely on documentation (rather than memory) to understand this aspect of their work, the documentation is frequently out of date because such documents, typically in the form of engineering drawings, are static and not always updated when changes are made within the plant. Additionally, such documentation typically includes loop sheets (devices and I/O), generated by the vendor, but no system context (control and operator displays). Clients frequently re-configure portions of the system after the loop sheets are generated and/or after the system is initially configured.

SUMMARY

In an embodiment, a method comprises displaying at a display a loop map for a control loop of a process plant. The loop map may depict a plurality of control loop elements of the control loop. The loop map may be utilized for control functions, monitoring functions (e.g., monitoring a tank level indication), or both control and monitoring functions. The method may comprise displaying at the display a control loop status associated with the loop map.

In an embodiment, a loop map system comprises one or more memory devices. The one or more memory devices may store: (i) a loop map for a control loop of a process plant, the loop map depicting a plurality of control loop elements of the control loop, and (ii) a record of statuses associated with the plurality of control loop elements. The loop map system may comprise a processor communicatively coupled to the memory. The loop map system may comprise a display communicatively coupled to the processor. The loop map system may comprise a first routine stored to the one or more memory devices that, when executed by the processor, causes the loop map system to designate a status from the record of statuses as a control loop status. Additionally, the loop map system may comprise a second routine stored to the one or more memory devices that, when executed by the processor, causes the loop map system to display via the display: (i) the loop map depicting the plurality of control loop elements, and (ii) the control loop status.

DETAILED DESCRIPTION

The present disclosure is directed to a loop interface for viewing the status of a control loop in a process control system. The described methods and systems give plant personnel situational awareness regarding control loops in a process control system. In particular, a user can utilize the loop interface described herein to quickly understand how a given element (e.g., a device, connection, or function block) relates to other elements of the control loop. This enables the user to appreciate how modifying a parameter or device, for example, may impact control of the process. The user need not be intimately familiar with the logic associated with a control loop to understand the status of the control loop and its constituent elements. Further, in an embodiment, the user can easily correct certain statuses (e.g., unusual conditions) that arise with respect to the control loop. The user can utilize the loop interface described herein to quickly understand how a given element (e.g., a device, connection, or function block) relates to other elements of the control loop. This enables the user to appreciate how modifying a parameter or device, for example, may impact control of the process. Overview of a Process Plant 10

Figure 1:
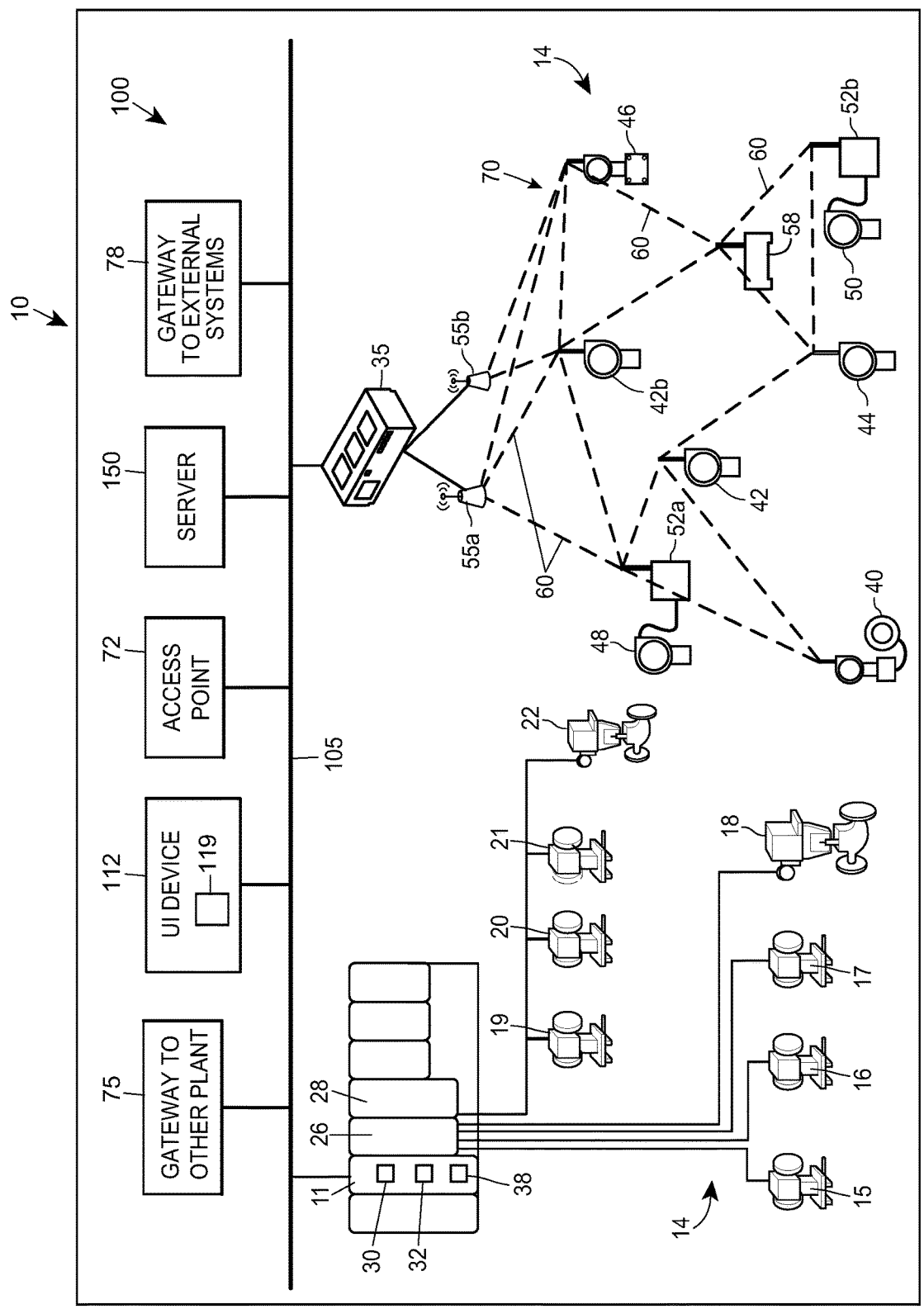
FIG. 1 is a block diagram of an example process control system for a process plant according to an embodiment.

FIG. 1 is a block diagram of an exemplary process control network 100 operating in a process control system or process plant 10. The process control network 100 may include a network backbone 105 providing connectivity directly or indirectly between a variety of other devices. The devices coupled to the network backbone 105 include, in various embodiments, combinations of access points 72, gateways 75 to other process plants (e.g., via an intranet or corporate wide area network), gateways 78 to external systems (e.g., to the Internet), UI devices 112 which may be stationary (e.g., a traditional operator workstation) or mobile computing devices (e.g., a mobile device smart-phone), servers 150, controllers 11, input/output (I/O) cards 26 and 28, field devices 14 (including wired field devices 15-22, wireless field devices 40-46, and wired field devices 48 and 50), wireless gateways 35, and wireless communication networks 70. The communication networks 70 may include wireless devices 40-58, which include wireless field devices 40-46, wireless adapters 52a and 52b, access points 55a and 55b, and router 58.

The wireless adapters 52a and 52b may be connected to non-wireless field devices 48 and 50, respectively. The controller 11 may include a processor 30, a memory 32, and one or more control routines 38. Though FIG. 1 depicts only a single one of some of the devices connected to the network backbone 105, it will be understood that each of the devices could have multiple instances on the network backbone 105 and, in fact, that the process plant 10 may include multiple network backbones 105.

The UI devices 112 may be communicatively connected to the controller 11 and the wireless gateway 35 via the network backbone 105. The controller 11 may be communicatively connected to wired field devices 15-22 via input/output (I/O) cards 26 and 28 and may be communicatively connected to wireless field devices 40-46 via the network backbone 105 and a wireless gateway 35. The controller 11 may operate to implement a batch process or a continuous process using at least some of the field devices 15-22 and 40-46. The controller 11, which may be, by way of example, the DeltaV™ controller sold by Emerson Process Management, is communicatively connected to the process control network backbone 105. The controller 11 may be also communicatively connected to the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1A, the controller 11, the field devices 15-22 and the I/O cards 26, 28 are wired devices, and the field devices 40-46 are wireless field devices.

Generally speaking, the I/O devices 26, 28 each act as an interface between one or more field devices 14 and the controller 11. For example, in an embodiment a field device 14 may be communicatively coupled to an I/O device 26, 28 via a wired connection for standard 4-20 ma communication. An I/O device 26, 28 may be further communicatively coupled to the controller 11 (via a backplane bus on a mount shared by the I/O device and controller, for example), enabling the controller 11 to communicate with the appropriate field device 14 via the I/O device 26, 28. In some instances, an I/O device 26, 28 may have multiple "termination points," each of which may be coupled to a field device 14. Each I/O device 26, 28 may be any type of I/O device conforming to any desired communication or controller protocol. For example, the I/O devices 26, 28 may be Fieldbus interfaces, Profibus interfaces, HART interfaces, WirelessHART interfaces, standard 4-20 ma interfaces, etc. In an embodiment, the controller 11 and I/O devices 26, 28 are mounted on a rail (e.g., in a marshaling cabinet) and communicate via a backplane.

Example I/O devices 26, 28 include: analog input (AI) cards, analog output (AO), discrete input (DI) cards, and discrete output (DO) cards. Control inputs may be received at an AI card in the form of analog signal or at a DI card in the form of a digital signal, and may be forwarded to the controller 11. Further, the controller 11 may cause an AO card to transmit a control output via an analog signal, and may cause a DO card to transmit a control output via a digital signal. Field devices 14 configured for an appropriate analog or digital communication protocol may be communicatively connected to the I/O devices 26, 28.

As noted, the UI devices 112 may be communicatively connected to the controller 11. In operation, the UI device 112 may, in some embodiments, execute a user interface ("UI"), allowing the UI device 112 to accept input via an input interface and provide output at a display. The UI device 112 may receive data (e.g., process related data such as process parameters, log data, sensor data, and/or any other data that may be captured and stored), from the server 150. In other embodiments, the UI may be executed, in whole or in part, at the server 150, where the server 150 may transmit display data to the UI device 112. The UI device 112 may receive UI data (which may include display data and process parameter data) via the backbone 105 from other nodes in the process control network 100, such as the controller 11, the wireless gateway 35, or the server 150. Based on the UI data received at the UI device 112, the UI device 112 provides output (i.e., visual representations or graphics) representing aspects of the process control network 100, allowing the user to monitor the process. The user may also affect control of the process by providing input at the UI device 112. To illustrate, the UI device 112 may provide graphics representing, for example, a tank filling process. In such a scenario, the user may read a tank level measurement and decide that the tank needs to be filled. The user may interact with an inlet valve graphic displayed at the UI device 112 and input a command causing the inlet valve to open.

In certain embodiments, the UI device 112 may implement any type of client, such as a thin client, web client, or thick client. For example, the UI device 112 may depend on other nodes, computers, UI devices, or servers for the bulk of the processing necessary for operation of the UI device 112, as might be the case if the UI device is limited in memory, battery power, etc. (e.g., in a wearable device). In such an example, the UI device 112 may communicate with the server 150 or with another UI device, where the server 150 or other UI device may communicate with one or more other nodes (e.g., servers) on the process control network 100 and may determine the display data and/or process data to transmit to the UI device 112. Furthermore, the UI device 112 may pass any data related to received user input to the server 150 so that the server 150 may process the data related to user input and operate accordingly. In other words, the UI device 112 may do little more than render graphics and act as a portal to one or more nodes or servers that store the data and execute the routines necessary for operation of the UI device 112. A thin client UI device offers the advantage of minimal hardware requirements for the UI device 112.

In other embodiments, the UI device 112 may be a web client. In such an embodiment, a user of the UI device 112 may interact with the process control system via a browser at the UI device 112. The browser enables the user to access data and resources at another node or server 150 (such as the server 150) via the backbone 105. For example, the browser may receive UI data, such as display data or process parameter data, from the server 150, allowing the browser to depict graphics for controlling and/or monitoring some or all of the process. The browser may also receive user input (such as a mouse click on a graphic). The user input may cause the browser to retrieve or access an information resource stored on the server 150. For example, the mouse click may cause the browser to retrieve (from the server 150) and display information pertaining to the clicked graphic.

In yet other embodiments, the bulk of the processing for the UI device 112 may take place at the UI device 112. The UI device 112 may also store, access, and analyze data locally.

In operation, a user may interact with the UI device 112 to monitor or control one or more devices in the process control network 100, such as any of the field devices 15-22 or the devices 40-48. The user may interact with the UI device 112, for example, to modify or change a parameter associated with a control routine stored in the controller 11. The processor 30 of the controller 11 implements or oversees one or more process control routines (stored in a memory 32), which may include control loops. The processor 30 may communicate with the field devices 15-22 and 40-46 and with other nodes that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be implemented by a user through the UI device 112. The control routines may be stored in any desired type of memory, such as random access memory (RAM), or read only memory (ROM) Likewise, the control routines may be hard-coded into, for example, one or more EPROMs, EEPROMs, application specific integrated circuits (ASICs), or any other hardware or firmware elements. Thus, the controller 11 may be configured (by a user using a UI device 112 in certain embodiments) to implement a control strategy or control routine in any desired manner.

In some embodiments, a user may interact with the UI device 112 to implement a control strategy at the controller 11 using what are commonly referred to as function blocks, wherein each function block is an object or other part (e.g., a subroutine) of an overall control routine and operates in conjunction with other function blocks (via communications called links) to implement process control loops within the process control system. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system. Of course, hybrid and other types of function blocks exist. The function blocks may have graphical representations that are provided at the UI device 112, allowing a user to easily modify the types of function blocks, the connections between the function blocks, and the inputs/outputs associated with each of function blocks implemented in the process control system. Function blocks may be stored in and executed by the controller 11, which is typically the case when these function blocks are used for, or are associated with standard 4-20 mA devices and some types of smart field devices such as HART devices, or may be stored in and implemented by the field devices themselves, which can be the case with Fieldbus devices. The controller 11 may include one or more control routines 38 that may implement one or more control loops. Each control loop is typically referred to as a control module, and may be performed by executing one or more of the function blocks.

Referring still to FIG. 1, the wireless field devices 40-46 communicate in a wireless network 70 using a wireless protocol, such as the Wireless HART protocol. In certain embodiments, the UI device 112 may be capable of communicating with the wireless field devices 40-46 using the wireless network 70. Such wireless field devices 40-46 may directly communicate with one or more other nodes of the process control network 100 that are also configured to communicate wirelessly (using the wireless protocol, for example). To communicate with one or more other nodes that are not configured to communicate wirelessly, the wireless field devices 40-46 may utilize a wireless gateway 35 connected to the backbone 105. Of course, the field devices 15-22 and 40-46 could conform to any other desired standard(s) or protocols, such as any wired or wireless protocols, including any standards or protocols developed in the future.

The wireless gateway 35 is an example of a provider device 110 that may provide access to various wireless devices 40-58 of a wireless communication network 70. In particular, the wireless gateway 35 provides communicative coupling between the wireless devices 40-58 and other nodes of the process control network 100 (including the controller 11 of FIG. 1A). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway, and other wireless nodes 52-58 of the wireless network 70 are producers and consumers of wireless communication packets.

In some scenarios, the wireless network 70 may include non-wireless devices. For example, a field device 48 of FIG. 1A may be a legacy 4-20 mA device and a field device 50 may be a traditional wired HART device. To communicate within the network 70, the field devices 48 and 50 may be connected to the wireless communication network 70 via a wireless adaptor (WA) 52a or 52b. Additionally, the wireless adaptors 52a, 52b may support other communication protocols such as Foundation® Fieldbus, PROFIBUS, DeviceNet, etc. Furthermore, the wireless network 70 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 70. The wireless devices 32-46 and 52-58 may communicate with each other and with the wireless gateway 35 over wireless links 60 of the wireless communication network 70.

In certain embodiments, the process control network 100 may include other nodes connected to the network backbone 105 that communicate using other wireless protocols. For example, the process control network 100 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices to communicate over a respective wireless network that is different from the wireless network 70 and that supports a different wireless protocol than the wireless network 70. In some embodiments, the UI device 112 communicates over the process control network 100 using a wireless access point 72. In some scenarios, in addition to portable computing devices, one or more process control devices (e.g., controller 11, field devices 15-22, or wireless devices 35, 40-58) may also communicate using the wireless network supported by the access points 72.

Additionally or alternatively, the provider devices may include one or more gateways 75, 78 to systems that are external to the immediate process control system. In such embodiments, the UI device 112 may be used to control, monitor, or otherwise communicate with said external systems. Typically, such systems are customers or suppliers of information generated or operated on by the process control system. For example, a plant gateway node 75 may communicatively connect the immediate process plant 10 (having its own respective process control data network backbone 105) with another process plant having its own respective network backbone. In an embodiment, a single network backbone 105 may service multiple process plants or process control environments.

In another example, the plant gateway node 75 may communicatively connect the immediate process plant to a legacy or prior art process plant that does not include a process control network 100 or backbone 105. In this example, the plant gateway node 75 may convert or translate messages between a protocol utilized by the process control big data backbone 105 of the plant 10 and a different protocol utilized by the legacy system (e.g., Ethernet, Profibus, Fieldbus, DeviceNet, etc.). In such an example, the UI device 112 may be used to control, monitor, or otherwise communicate with systems or networks in said legacy or prior art process plant.

The provider devices may include one or more external system gateway nodes 78 to communicatively connect the process control network 100 with the network of an external public or private system, such as a laboratory system (e.g., Laboratory Information Management System or LIMS), a personnel rounds database, a materials handling system, a maintenance management system, a product inventory control system, a production scheduling system, a weather data system, a shipping and handling system, a packaging system, the Internet, another provider's process control system, or other external systems. The external system gateway nodes 78 may, for example, facilitate communication between the process control system and personnel outside of the process plant (e.g., personnel at home).

Although FIG. 1 illustrates a single controller 11 with a finite number of field devices 15-22 and 40-46, this is only an illustrative and a non-limiting embodiment. Any number of controllers 11 may be included in the provider devices of the process control network 100, and any of the controllers 11 may communicate with any number of wired or wireless field devices 15-22, 40-46 to control a process in the plant 10. Furthermore, the process plant 10 may also include any number of wireless gateways 35, routers 58, access points 55, wireless process control communication networks 70, access points 72, and/or gateways 75, 78.

The UI device 112 includes a memory storing a loop map interface routine ("loop interface" or "loop map interface") 119, which may be executed by a processor of the UI device 112 to provide an interface for viewing and interacting with a loop map.

When executing the loop interface 119, the UI device 112 provides an interface (e.g., via a display) for viewing and interacting with a loop map. A loop map is a graphical representation of a control loop in the process control system 10. The loop map may depict elements of the control loop, including the hardware and/or software elements. Operators and other users may rely on the loop map for situational awareness regarding the control loops and its elements. In some instances, the UI device 112 itself may be depicted by a loop map displayed by the loop interface 119 at the UI device 112. For example, if the UI device 112 is typically used to monitor a control loop controlled by the controller 11, the loop map may depict the UI device 112 in the loop map.

Figure 2:
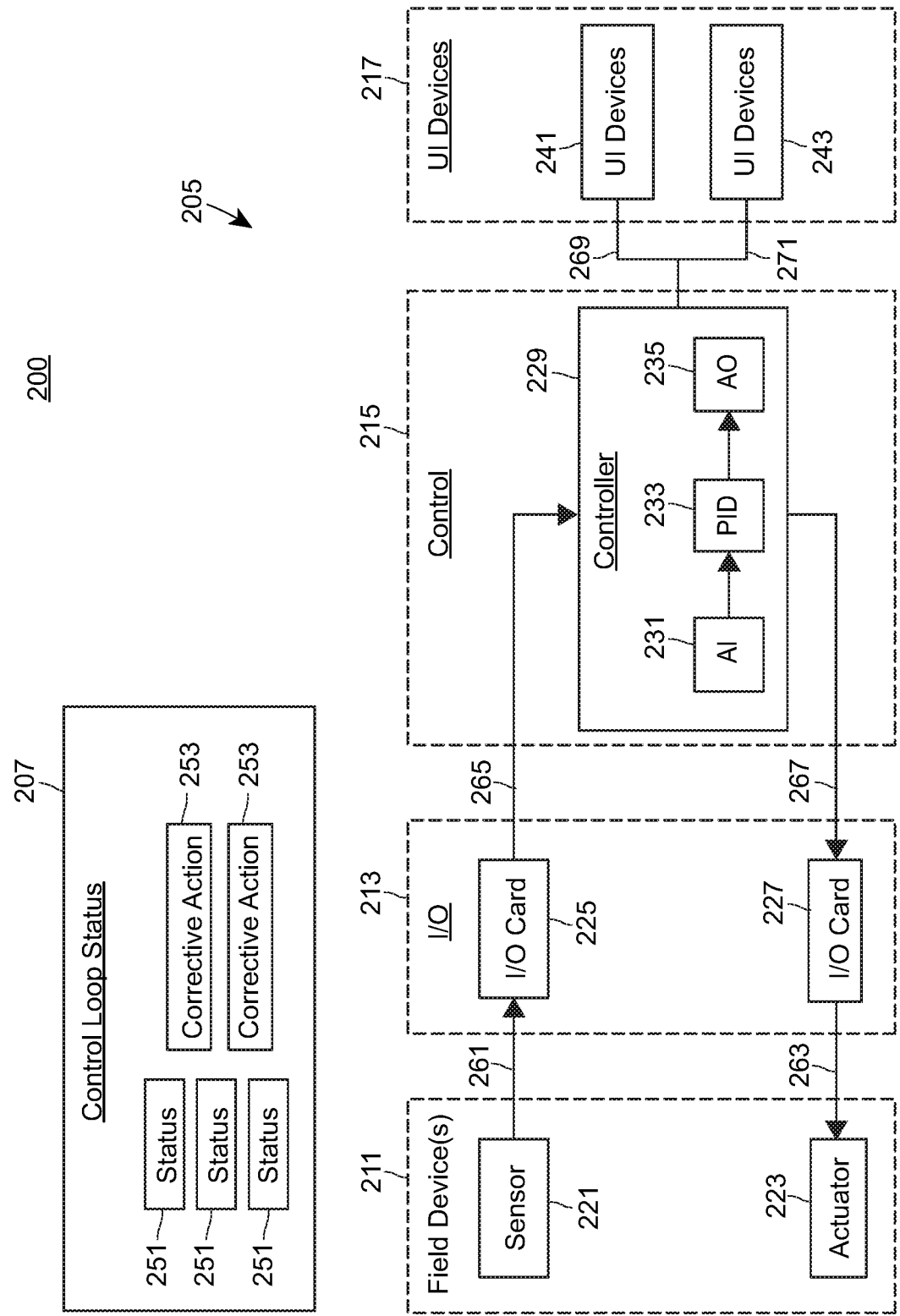
FIG. 2 depicts an example genericized display that may be generated by a loop interface and displayed at a user interface device according to an embodiment.

By displaying a loop map for a given control loop, the loop interface 119 enables a user to better understand (i) the way in which the control loop fits into the broader process control system, (ii) the elements making up the control loop; (iii) the status of the various elements of the control loop; and (iv) consequences of potential actions the user might take regarding the control loop. An example display 200 and example loop map 205, each of which may be generated by the loop interface 119, are shown in FIG. 2. The UI device 112 and the loop interface 119 are discussed in more detail with reference to FIG. 3

I. An Example Genericized Display 200 Generated by the Loop Interface 119

FIG. 2 depicts an example genericized display 200 that may be generated by the loop interface 119 and displayed at the UI device 112 according to an embodiment. The display 200 includes a loop map 205 and a control loop status viewer 207, which may be utilized for control functions and/or monitoring functions. The control loop status viewer 207 depicts one or more statuses 251 and one or more corrective actions 253.

The loop map 205 depicts various elements of a control loop for the process control system 10, such as field devices 211 in the control loop, I/O devices 213 in the control loop, controllers 215 in the control loop, and operator displays 217 in the control loop. The field devices 211 depicted by the loop map 205 include a sensor 221 and an actuator 223. The I/O devices 213 include I/O cards 225 and 227. The controllers 215 include the controller 229, which includes function blocks 231-235 of a control routine implemented by the controller 229. The operator displays 217 include UI devices 241 and 243. Further, the loop map 205 depicts: (i) communication links 261 and 263 between the field devices 211 and the I/O devices 213; (ii) communication links 265 and 267 between the I/O devices 213 and the controller 229; and (iii) communication links 269 and 271 between the controller 229 and the operator displays 217.

Using the loop map 205, personnel can make decisions based on the potential impact of their actions and decide who to call based on the location of a failure, which may be displayed in the context of the control loop depicted by the loop map 205, rather than just in the context of the device in question. In short, the loop map 205 and loop status viewer 207 provide contextual information about a control loop. A user can look at the loop map 205 and quickly understand how a particular element of the control loop relates to other elements. For example, a user can quickly determine that the control loop includes function blocks 231-235, which are implemented by the controller 229. Further, the user can quickly determine which field devices 211 and I/O devices 213 in the plant are communicatively coupled to the controller 229.

The loop map 205 may be displayed in response to a user clicking on a button or clicking on an item from a drop down menu. For example, a user might monitor the controlled process at the UI device 241. The user might notice something is wrong with an actuator 223, and may click a graphical button or control to see a loop map associated with the actuator 223, which may cause the UI device 112 to generate the display 200 showing the loop map 205. In this example, the loop map 205 depicts the hardware and software elements of the control loop that the actuator 223 is connected to, enabling the user to quickly understand how the actuator 223 is related to other aspects of the process control system 10. In some instances, a single device may be connected to multiple controllers, control routines, and/or function blocks. For example, the actuator 223 may be associated with multiple control loops, and the UI device 112 may display a loop map for each of the multiple control loops. In some instances, the UI device 112 may display a loop map for multiple control loops configured for cascade control (i.e., multiple control loops configured to control a single control variable). As explained below, the UI device 112 may display interlock data associated with the loop map 205.

In an embodiment, the loop interface 119 automatically updates the loop map 205 to reflect the current configuration of the process control system 205, and may not require re-configuration or manual updating. For example, if the sensor 221 is replaced by a new sensor, the loop interface 119 may automatically update the loop map 205 to depict the new sensor. Further, as devices and software develop errors or communication failures, for example, the loop interface 119 may update the loop map 205 and/or viewer 207 to depict these errors or failures.

Generally speaking, the status 251 is a condition associated with a control loop. In some instances, the status 251 may be a status associated with a particular element of a control loop. For example, the status 251 may be a health status, an alarm, or an unusual condition. The statuses 251 may correspond to any elements of the control loop depicted by the loop map 205. For example, one or more of the statuses 251 may correspond to the hardware elements of the control loop (e.g., the field devices 211, the I/O devices 213, the controller 229, or the operator display 217). To illustrate, the status 251 may indicate that a hardware element is active or healthy. The status 251 may also indicate that a hardware element is inactive or faulty. For example, the status 251 may indicate that the I/O card 225 is in failure. The user can look at the loop map 205 to quickly determine that the controller 229 and sensor 221 will be affected by this failure, and might, for example, determine that problems with the controller 229 can be attributed to the fact that the I/O card 225 is offline. The user might also look at the loop map 205 to determine the root cause of an alarm flood. In short, the loop map 205 enables personnel to make decisions based on the potential impact of their actions and decide who to call based on the location of the failure, which may be displayed in the context of the control loop, rather than just in the context of the device. As another example, one or more of the statuses 251 may identify the status for a communication link 261-271.

One or more of the statuses 251 may correspond to the software elements of the control loop (e.g., the function blocks 231-235).

In some instances, the display 200 may provide one or more corrective actions 253 corresponding to the statuses 251. A user might click on a displayed corrective action 253, for example, to clear or reset the corresponding status. In some instances, clicking on the corrective action 253 may cause the UI device 112 to display an instruction or task (e.g., setting another status or condition).

In some instances, a user's interactions with a displayed status 251 and/or action 253 may drive context highlighting on the loop map 205. For example, a user hovering a mouse cursor over the status 251 may cause the UI device 112 to highlight a corresponding element shown on the loop 205. Highlighting may include changing or emphasizing a color or shading of the corresponding element, underlining a corresponding element, surrounding a corresponding element with a circle or rectangle, blurring out the other elements depicted in the loop map 205, changing a size of the element, or changing some other visual characteristic of the element.

In some instances, a user's interactions with a displayed status 251 and/or action 253 may drive navigational jumping to the corresponding element. For example, when a user clicks on a displayed status 251, the UI device 112 may cause the mouse cursor to "jump" to the corresponding element.

In an embodiment, the UI device 112 may depict the status 251 (e.g., as an icon) near a corresponding element (i.e., near an element experiencing an unusual condition or abnormal status). For example, if a communication failure exists between the sensor 221 and the I/O card 225, the UI device 112 may depict an icon next to the communication link 261 to indicate a communication failure associated with the link 261. In some instances, clicking on the icon may set or clear the status 251. In some instances, clicking on the element itself may set or clear the status 251.

The statuses 251 may be driven by logic specified by a user. The user settings 377 shown in FIG. 3 may include this logic. In some instances, the depicted statuses 251 may be explicitly set by a user. The statuses 251 may include statuses indicating normal or healthy functioning. That is, in some embodiments, the status 251 does not necessarily need to reflect an error, unusual condition, or abnormal status in order to be depicted by the loop map 205.

The loop map 205 and the statuses 251 give a user situational awareness regarding the status of the depicted control loop and its constituent elements. The statuses 251 are presented in a way that users can understand, even if the users are not intimately familiar with the logic driving the statuses. Further, the loop interface 119 enables a user to directly manipulate the logic driving the statuses 251, making it easier for the user to perform a task such as setting a bypass.

This is in contrast to traditional systems in which diagnosing and troubleshooting problems is more difficult. In traditional systems, when unusual conditions arise, a control engineer is called upon to diagnose the situation. To understand the running logic, the control engineer selects an individual function block from a logic diagram and inspects the block's error parameters, in a parameter list, to decipher any unusual conditions (e.g. bypasses, overrides, latched values). Depending on the situation the control engineer may have to perform a task (e.g. set a bypass), that will create the non-standard or atypical condition, to temporarily workaround the problem. This too is typically done by clicking on a block and setting a parameter value. This traditional approach is time-consuming and mentally taxing due to the control engineer's hopping between blocks and parameter lists. This traditional approach in which an engineer is forced to look away from a displayed diagram to reference a parameter list, for example, can be incredibly difficult.

Operators may suffer similar problems when monitoring one or more control loops. For example, an operator may go through multiple menus, control views, and parameter lists of multiple function blocks in attempt to evaluate the overall condition of a control loop. If a control loop has numerous unusual conditions, the operator may struggle to ascertain whether the unusual conditions relate to one another and, if they do, an extent to which one unusual condition causes another. These problems are exacerbated by stressful situations, when operators sometimes experience tunnel vision. In short, optimal control requires that operators quickly obtain situational awareness, but they often have little time to resolve problems when the plant is running. The loop interface 119 and UI device 112 enable operators to quickly obtain situational awareness.

II. The UI Device 112 and Loop Interface 119

Figure 3:
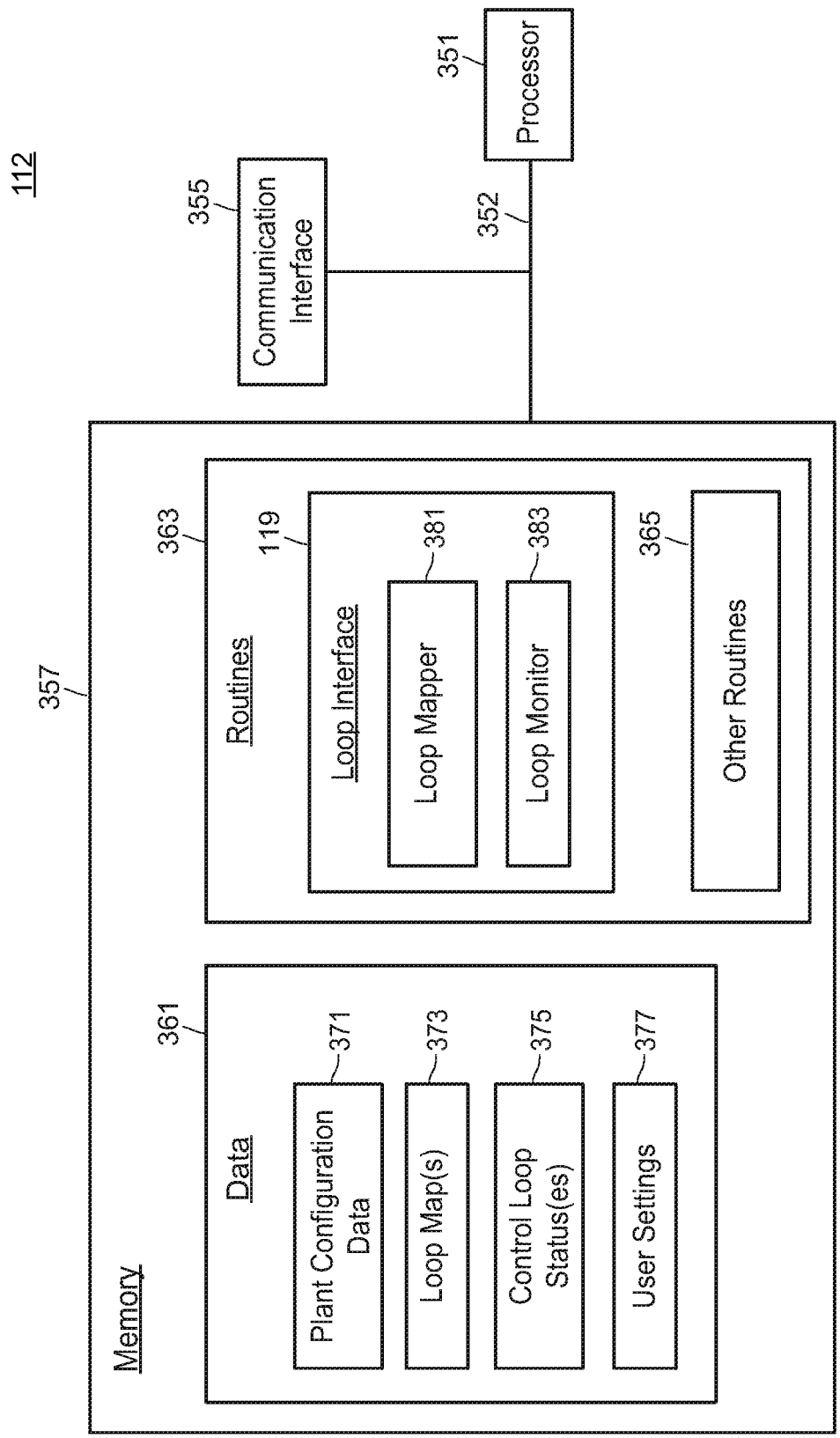
FIG. 3 is a block diagram of a user interface device according to an embodiment.

FIG. 3 is a block diagram of the UI device 112 (also shown in FIG. 1) according to an embodiment. The UI device 112 may function as a user interface for controlling and/or monitoring the process controlled by the process control system 10, for example, by providing output (i.e., visual representations or graphics) representing aspects of the process.

In certain embodiments, the UI device 112 may be any type of client, such as a thin client or thick client. For example, the UI device 112 may depend on other nodes, computers, or servers for the bulk of the processing necessary for operation of the UI device 112. In some embodiments, the bulk of the processing for the UI device 112 takes place at the UI device 112.

The UI device 112 includes a processor 351, a communication interface 355, and a memory 357, each of which may be communicatively connected via a system bus 352. The memory 357 stores data 361 and routines 363. The data 361 includes plant configuration data 371, loop map data 373, control loop status data 375 (also referred to as "status data 375"), and/or user setting data 377. The routines 363 include the loop interface 119 (also shown in FIG. 1) and various other routines 365 (e.g., an operating system, a user interface routine, etc.). The loop interface 119 includes a loop mapper 381 and a loop monitor 383. In an embodiment, one or more of the routines 381 and 383 are subroutines of the loop interface 119. In an embodiment, one or more of the routines 381 and 383 are standalone routines.

A. The Communication Interface 355

The UI device 112 may be communicatively connected to other devices or systems via the communication interface 355. The communication interface 355 may function as a network interface (e.g., including a network card), enabling the UI device 112 to connect to the network 105 (via a wireless or wired connection) and/or as a an input/output (I/O) interface (e.g., including a USB interface, a serial port, a parallel port, a SCSI, etc.), enabling the UI device 112 to accept input via one or more input devices (e.g., keyboard, mouse, microphone, cameras, etc.) and provide output via one or more output devices (e.g., a display, speakers, etc.).

The communication interface 353 may include circuitry for wireless and/or wired communication with one or more devices or systems using any suitable communications protocol. Wireless communication may be short-range and/or long-range. For example, a communication interface may support Wi-Fi (e.g., an 802.11 protocol), Ethernet, Bluetooth, high frequency systems (e.g., 900 MHZ, 2.4 GHZ, and 5.6 GHZ communication systems), infrared, transmission control protocol/internet protocol ("TCP/1P") (e.g., any of the protocols used in each of the TCP/IP layers), hypertext transfer protocol ("HTTP"), BitTorrent, file transfer protocol ("FTP"), real-time transport protocol ("RTP"), real-time streaming protocol ("RTSP"), secure shell protocol ("SSH"), any other communications protocol, or any combination thereof. The communication interface 353 may include circuitry that enables the UI device 112 to be electrically or optically coupled to another device (e.g., via a coax cable or fiber optic cable) and to communicate with that other device.

A user may utilize such input and output devices to affect control of the process. To illustrate, the UI device 112 may generate display graphic items (e.g., at a display connected to the communication interface 355) representing, for example, a tank filling process. In such a scenario, a user may read a tank level measurement and decide that the tank needs to be filled. The user may interact (e.g., via a mouse or keyboard connected to the communication interface 355) with an inlet valve graphic displayed at the UI device 112 and input a command causing the inlet valve to open.

B. The Plant Configuration Data 371

The plant configuration data 371 is data relating to the configuration of the process control system 10. For example, the plant configuration data 371 may identify elements of the process control system 10, relationships between the elements, and/or parameters used by the elements. For example, the plant configuration data 371 may identify devices installed in the plant controlled by the process control system 10 (e.g., field devices 14; I/O devices 26-28; controllers 11; communication equipment such as servers, routers, modems, switches, etc.; workstations 110; etc.), relationships between the devices, function blocks utilized by one or more of the devices (e.g., utilized by controllers 11 and/or field devices 14), relationships between the function blocks, and/or parameters used by the devices and/or function blocks.

The plant configuration data 371 may also include documentation, such as loop sheets.

C. The Loop Map Data 373

The loop map data 373 identifies one or more loop maps configured for the process control system 10. As an example, the loop map data 373 may identify the loop map 205 shown in FIG. 2.

In a loop map for a particular control loop, the loop map data 373 may include (or reference) data representing at least one of the following elements of the particular control loop: field devices 14 included in the control loop; I/O devices 26-28 included in the control loop; controllers 11 included in the control loop; workstations 110 that can be utilized to view and/or configure the control loop; a control routine 38 implemented by the control loop (which may include one or more function blocks configured to define the control routine 38), etc. Further, for the loop map for the particular control loop, the loop map data 373 may identify relationships between the elements. For example, the loop map data 373 may specify the physical links between a field device 14 and controller 11 (e.g., specifying one of the I/O devices 26-28, the particular communication links between the field device 14 and controller 11, and/or the specific data transmitted between the field device 14 and controller 11). As another example, the loop map data 373 may specify the logical links between function blocks.

Moreover, the loop map data 373 may include (or reference) graphic items depicting the aforementioned control loop elements. These graphic items may be utilized (e.g., by the UI device 112) to graphically depict the control loop and its constituent elements.

The loop data 373 may include the loop map 205. More particularly, the loop data 373 may include graphic items representing elements of the depicted control loop, including graphic items for the field devices 211, the I/O devices 213, the controller 229, the operator displays 217, and/or the function blocks 231-235. The loop data 373 may also include or reference plant configuration data 371 for each of the depicted elements. This may include a unique identifier for each of the elements (e.g., a "tag"), for example, and/or various parameters about the depicted element. For example, the configuration data 371 may indicate the type of information detected and transmitted by the sensor 221. For a particular control loop, the loop map data 373 may reference corresponding status data 375.

D. The Status Data 375

The status data 375 identifies one or more statuses 251 for a control loop or for elements of the control loop. For example, the status data 375 may include data representing statuses 251 of the control loop 205. The statuses 251 may include a health status for the sensor 221, the I/O card 225, or the link 261, for example. The statuses 251 may include alarms for parameters measured or controlled by the control loop (e.g., for high or low flows, temperatures, etc.). The statuses 251 may include unusual conditions, such as bypasses, overrides, and latched values. An override may specify a value to be input to a control routine or function block in the event a condition such as an alarm arises. A bypass may specify an alternate material flow to be activated in the event a condition such as an alarm arises (activated by opening a bypass valve, for example). A bypass may also specify an alternate routine or set of function blocks to activate in the event a condition arises. A latched value may be a value set in response to a limit being exceeded, even if only briefly.

The status data 375 may specify corrective actions 253 for one or more statuses 251 (e.g., to correct an "unusual condition").

E. User Setting Data 377

The user setting data 377 includes settings and other information provided by a user. For example, the user setting data 377 may include statuses 251 or conditions explicitly set by a user. The user setting data 377 may also include rules for setting or triggering certain statuses 251 (which may be reflected by the control loop statuses 375). The loop monitor 383 may monitor the process and set statuses 251 in accordance with these rules.

F. The Loop Mapper 381

The loop mapper 381 generates loop maps, such as the loop map 205. The mapper 381 may reference the plant configuration data 371 to identify control routines, for example. The mapper 381 may then "map" a loop map by identifying the input and output variables associated with a control routine, for example, and the field devices and other devices associated with those inputs and outputs (e.g., a flow indicator associated with a flow measurement, or a valve associated with a valve position command). The mapper 381 may rely on a library of templates for various process control elements when generating the graphic items for the elements of a control loop. Once the mapper 381 has "mapped" a loop map, the loop map may be stored as loop map data 373.

The mapper 381 may cause the UI device 112 to display a loop map. The mapper 381 may reference the loop map data 373 to generate a display (such as the display 200). In particular, the loop mapper 381 may reference the loop map data 373 and cause the UI device 112 to display the loop map 205 in response to a user request. The loop mapper 381 may also reference the status data 375 to cause the UI device 112 to display statuses 251 associated with the loop map 205.

G. The Loop Monitor 383

The loop monitor 383 monitors control loops, such as the control loop depicted by the loop map 205 shown in FIG. 2. For example, the loop monitor 383 may cause the workstation 110 to communicate with field devices 14 and to receive various parameters from the field devices relating to the status 251 (e.g., to a health status) of the field devices 14. These parameters may be alarms or operating parameters for the field devices 14. Put simply, the loop monitor 383 may update the status data 375 to include data mirroring data collected or generated by other elements of the process control system (e.g., by the field devices 14, the I/O devices 26-38, etc.).

Further, the loop monitor 383 may include logic for setting values of parameters relating to the status 251 of control loops or control loop elements. The loop monitor 383 may trigger the status 251 for a particular control loop element based on one or more rules, which may be defined by a user and stored to the user settings 377.

For example, the user settings 377 may include a rule stipulating that a "No Comm" status (to indicate a communication failure) should be set or triggered when the communication link 261 fails. Accordingly, the loop monitor 383 may check for such a failure by periodically polling the sensor 221 to ensure the communication link 261 is healthy, for example. When the sensor 221 fails to respond to the polling within a certain period of time, the loop monitor 383 may set a value for a communication status variable (in accordance with a rule defined by the user settings 377) to indicate a communication failure (e.g., by setting CommStat 261 to a value of 0), for example.

III. Example Method 400

Figure 4:
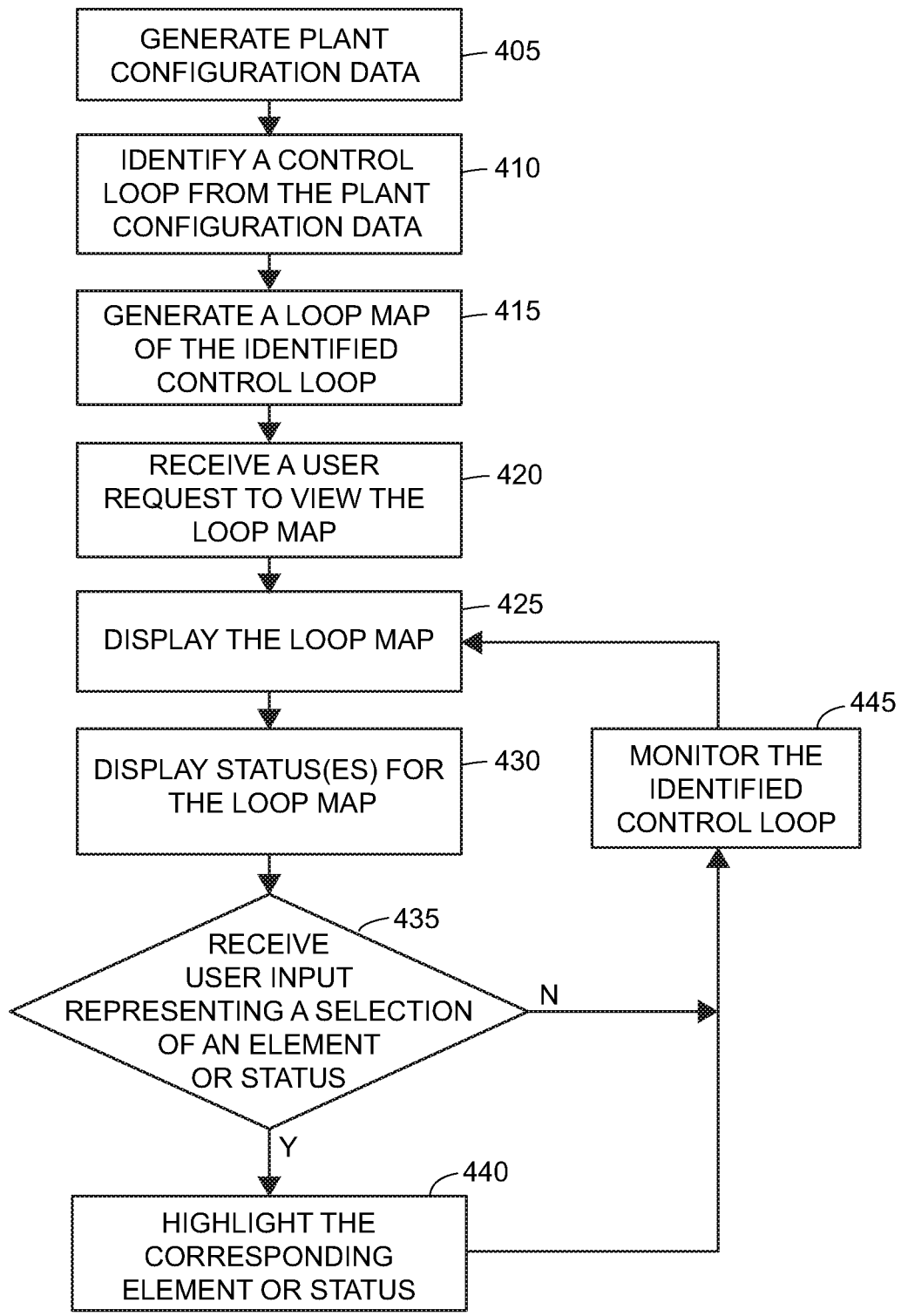
FIG. 4 depicts an example method of implementing a loop interface according to an embodiment.

FIG. 4 depicts an example method 400 of implementing a loop interface according to an embodiment. The method may be implemented, in whole or in part, by one or more systems or devices described herein.

The method 400 begins when plant configuration data 371 is generated (block 405). The configuration data 371 may be generated by way of a user configuring various aspects of the plant.

A control loop is identified from the plant configuration data 371 (block 410). The control loop may be identified by the loop mapper 381. In an embodiment, the loop mapper 381 is implemented by the UI device 112. In another embodiment, the loop mapper 381 is implemented by a computing device other than the UI device 112. The loop mapper 381 may identify the control loop by evaluating the plant configuration data 371 to identify links between elements (e.g., devices and/or function blocks) of the process control system 10.

After the control loop is identified, the loop mapper 381 may generate the loop map 205 to depict the identified control loop (block 415). The loop mapper 381 may store to memory graphic items corresponding to the elements of the identified control loop.

A user request to view the loop map 205 may be received (block 420) at the UI device 112. The request may be received by way of the user interacting with the operator display 500 shown in FIG. 5.

In response to receiving the request, the loop mapper 381 may display the loop map 205 (block 425). The statuses 251 associated with the loop map 205 may be displayed by the loop mapper 381 (block 430).

The control loop is monitored by the loop monitor 383 (block 445). In response to changes to the to the control loop, the control loop monitor 383 may cause the loop mapper 381 to update the depicted loop map 205 and statuses 251. For example, the loop monitor 383 may detect an abnormal condition experienced by the actuator 223. To illustrate, if the actuator 223 is a pump, the loop monitor 383 may detect when the motor driving the pump has failed or experienced a preventative shutdown. In accordance with this detection, the control loop monitor 383 may cause the loop mapper 381 to display an appropriate status 251. As another example, the loop monitor 383 may detect that a new actuator has been installed to replace the actuator 223. The loop monitor 383 may cause the loop mapper 381 to update the loop map 205 so that it depicts the new actuator.

When user input representing a selection of an element or status is received (block 435), the corresponding element or status may be highlighted (block 440). That is, a user may select the status 251. In response to detecting the user's selection, the loop mapper 381 may highlight an element depicted by the loop map 205 that corresponds to the selected status 251. Similarly, a user may select an element depicted by the loop map 205. In response to detecting the user's selection, the loop mapper 381 may highlight one or more statuses 251 corresponding to the selected element. The loop monitor 383 may continue to monitor the control loop while responding to user input.

IV. Example Operator Display 500

Figure 5:
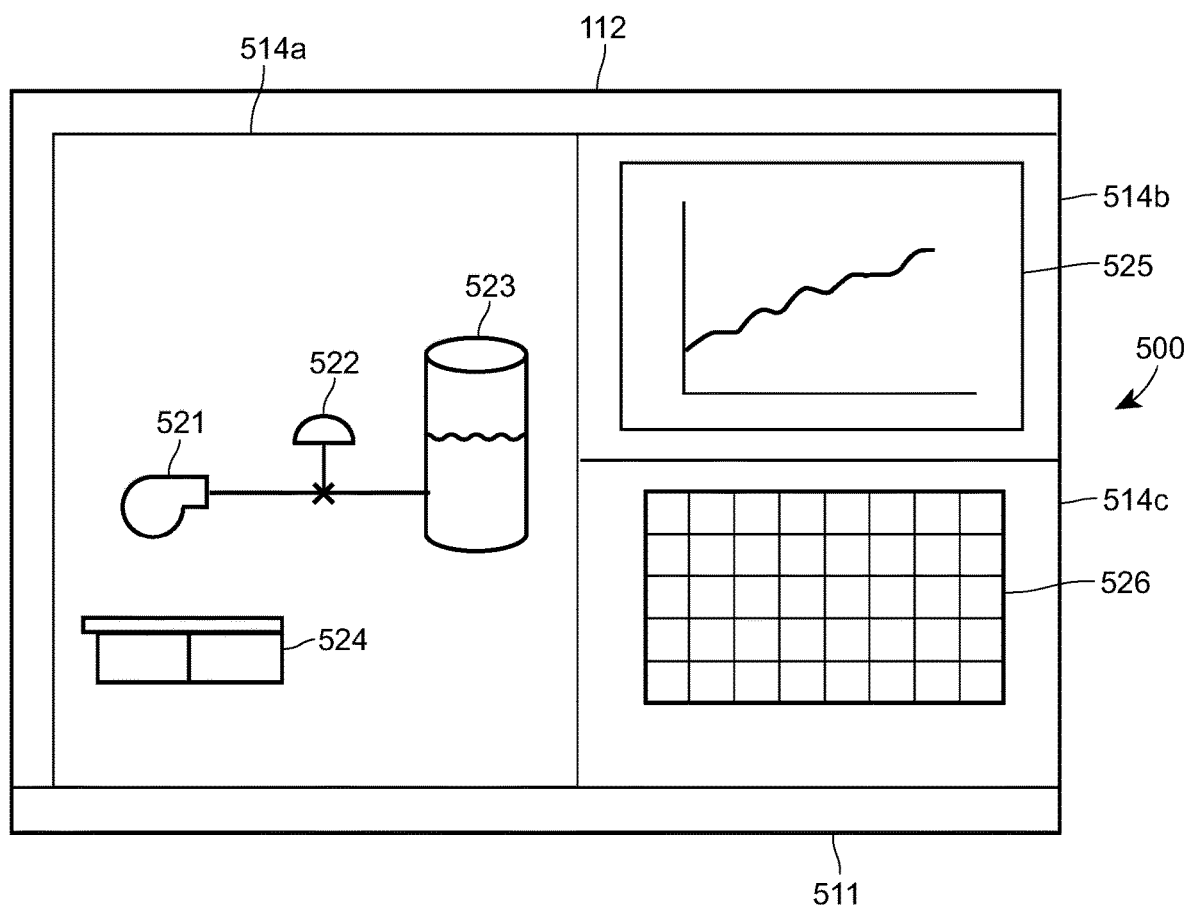
FIG. 5 shows an example operator display that may be presented by a user interface device according to an embodiment.

FIG. 5 shows an example operator display 500 that may be presented by the UI device 112 according to an embodiment. The display 500 may include sub-displays 514a, 514b, and or 514c. The display 514a includes a schematic of part of an equipment module (i.e., a particular group or set of equipment) including a pump 521, control valve 522, and an accumulation tank 523. The display 514a also includes a data table 524, which may include values for relevant parameters (e.g., a tank level or flow level). The display 514b includes a trend graphic 525. The display 514c includes a grid graphic 526, which may show ongoing data accumulation in numerical form (e.g., for various variables associated with the equipment depicted in the schematic in display 514a).

A user may utilize the display 500 to monitor at least part of the process control system 10. For example, as the tank 523 is being filled, the data table 524 may display a tank level (e.g., in gallons). Because additional information may be helpful, the display 514b may depict a trend for the tank level or for the flow of liquid entering the tank. In some instances, the trend may depict set-points or limits for alarms, enabling a user to visualize the extent to which a given variable is approaching a desired value or a limit.

In some instances, a user may interact with the display 500 to cause the UI device 112 to display the display 200 shown in FIG. 2. For example, a user might click on one of the graphic items depicting the equipment 521-523. The UI device 112 may display a dropdown menu, for example, from which the user may select a command such as "view loop map." Clicking on the command may cause the UI device 112 to display the display 200.

V. Example Displays 600-1100

Figure 6:
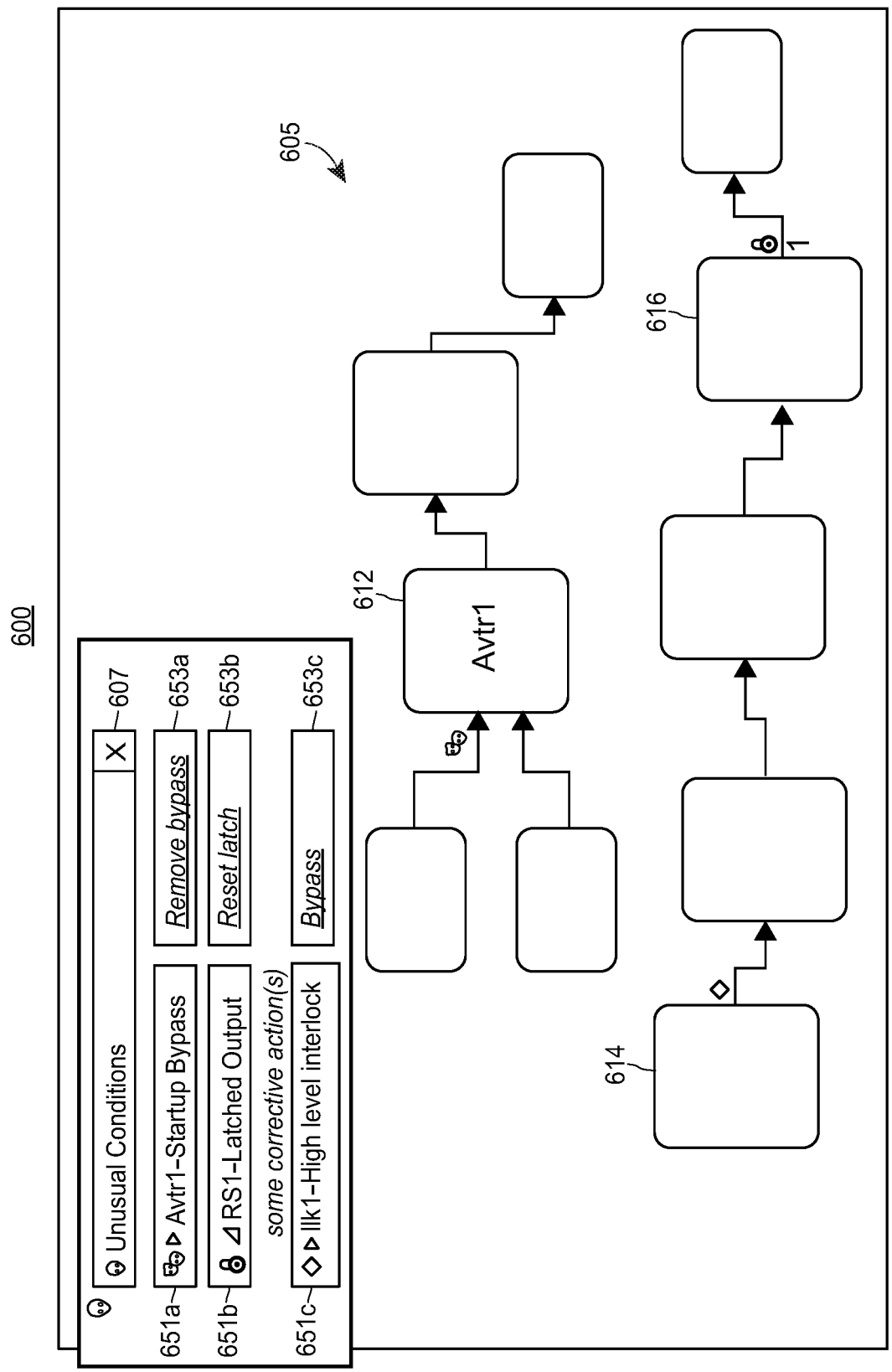
FIG. 6 depicts an example display depicting a loop map and a control loop status viewer according to an embodiment.

FIG. 6 depicts an example display 600 that may be generated by the loop interface 119 and displayed at the UI device 112 shown in FIG. 1, according to an embodiment. The display 600 includes a loop map 605 and a control loop status viewer 607. The loop map 605 depicts software elements of a control loop, and more particularly, function blocks of a control loop, including function blocks 612, 614, and 616. The status viewer 607 includes statuses 651a-c and corrective actions 653a-c. As shown, the status 651a (a startup bypass) is a status for the function block 612. Accordingly, the loop map 605 depicts an icon next to the function block 612 representing the status 651. Similarly, the status 651b corresponds to the function block 614 and the status 651c corresponds to the function block 616. The statuses may 651a-c may be corrected by a user interacting with the corrective actions 653a-c.

Figure 7:
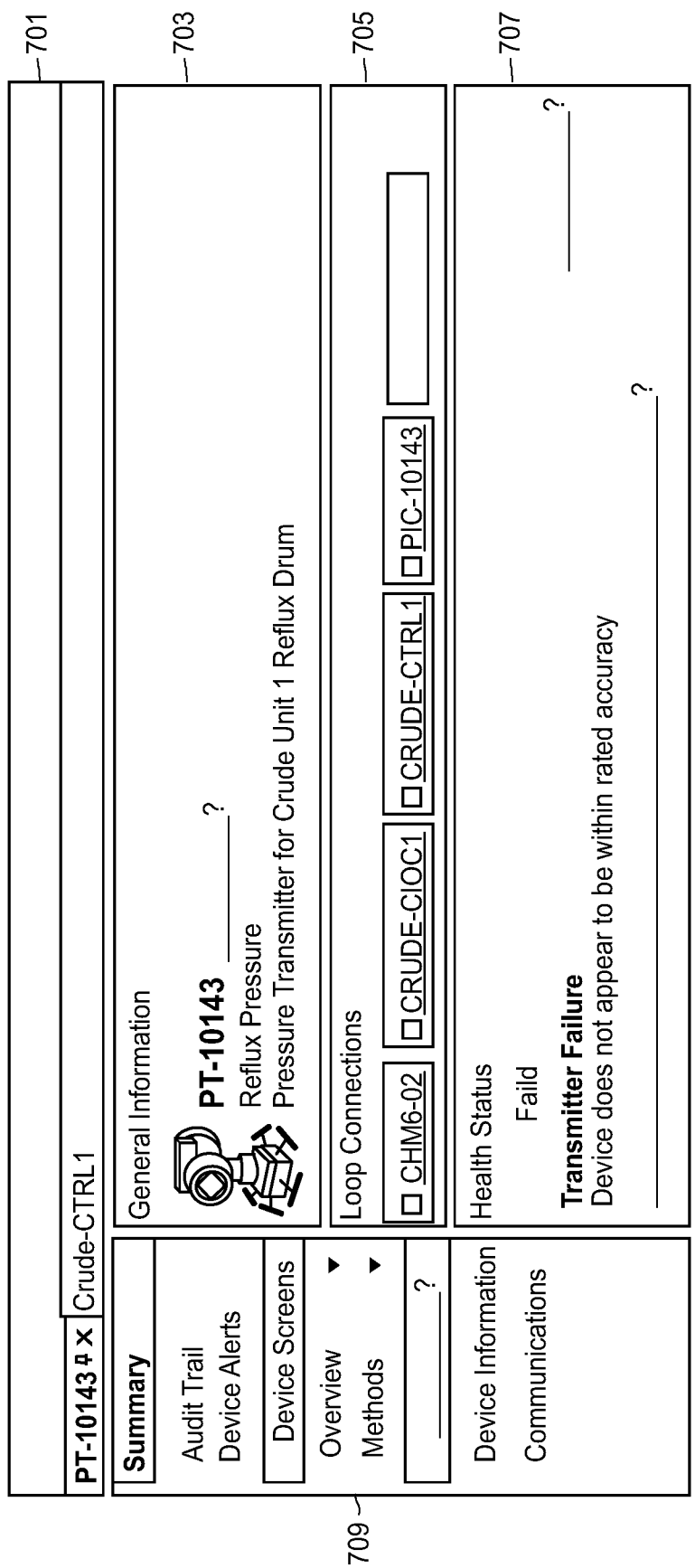
FIG. 7 depicts an example device display that may be generated by a loop interface and displayed at a user interface device according to an embodiment.

FIG. 7 depicts an example device display 700 that may be generated by the loop interface 119 and displayed at the UI device 112 according to an embodiment. The display 700 includes a title bar 701, device information 703, loop connections 705, a status display 707, and a menu 709.

The title bar 701 may include a name or tag for a device (e.g., PT-10143) and the name of a controller (e.g., Crude-CTRL1) configured to control the device. The device information 703 may include information about the device. For example, the device information 703 may indicate a brand and/or type for the device.

The loop connections 705 may include loop connections for the displayed device. For example, the loop connections 705 may identify particular I/O devices in communication with the device (e.g., CHM6-02 and Crude-CIOC1), controllers in communication with the device (e.g., Crude-CTRL1), and/or control routines configured to control the device (e.g., PIC-10143). The loop connections 705 may include an interactive element (e.g., a button) that a user can select to view a full loop map associated with the device. Selecting this element may cause the UI device 112 to display a loop map such as the loop map 205, for example.

The status display 707 may identify a status associated with the device, such as a health status. In an embodiment, the status display 707 may display a corrective action associated with the status, which the user may select to correct the associated status.

The menu 709 may include interactive elements for displaying additional information. For example, an item in the menu may enable a user to view alerts associated with the device, to view overview or method screens associated with the device, or to troubleshoot communication problems or device problems.

Figure 8:
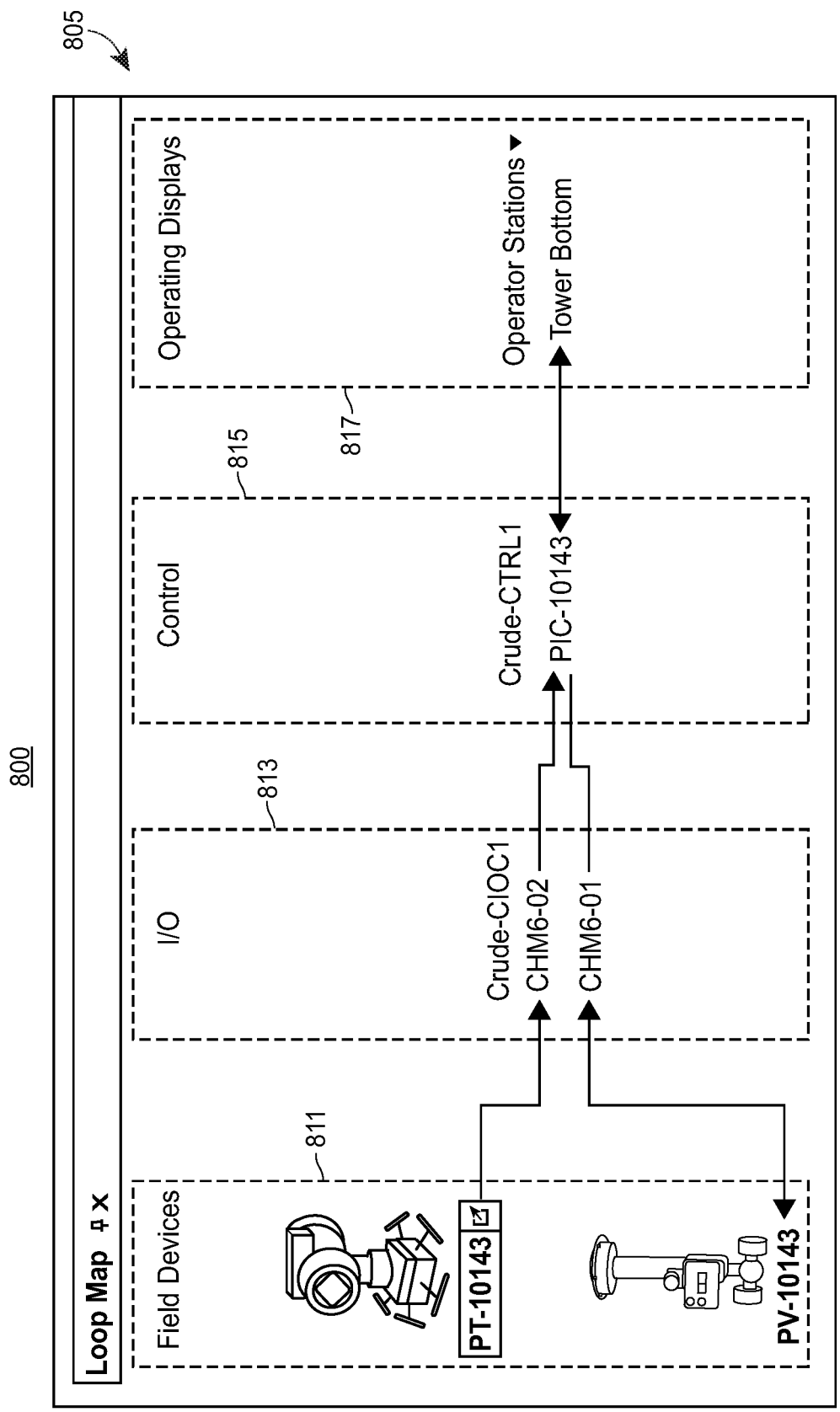
FIG. 8 depicts an example display including a loop map according to an embodiment.

FIG. 8 depicts an example display 800 including a loop map 805 according to an embodiment. The loop map 805 depicts field devices 811, I/O devices 813, a controller 815, and an operator display 817.

Figure 9:
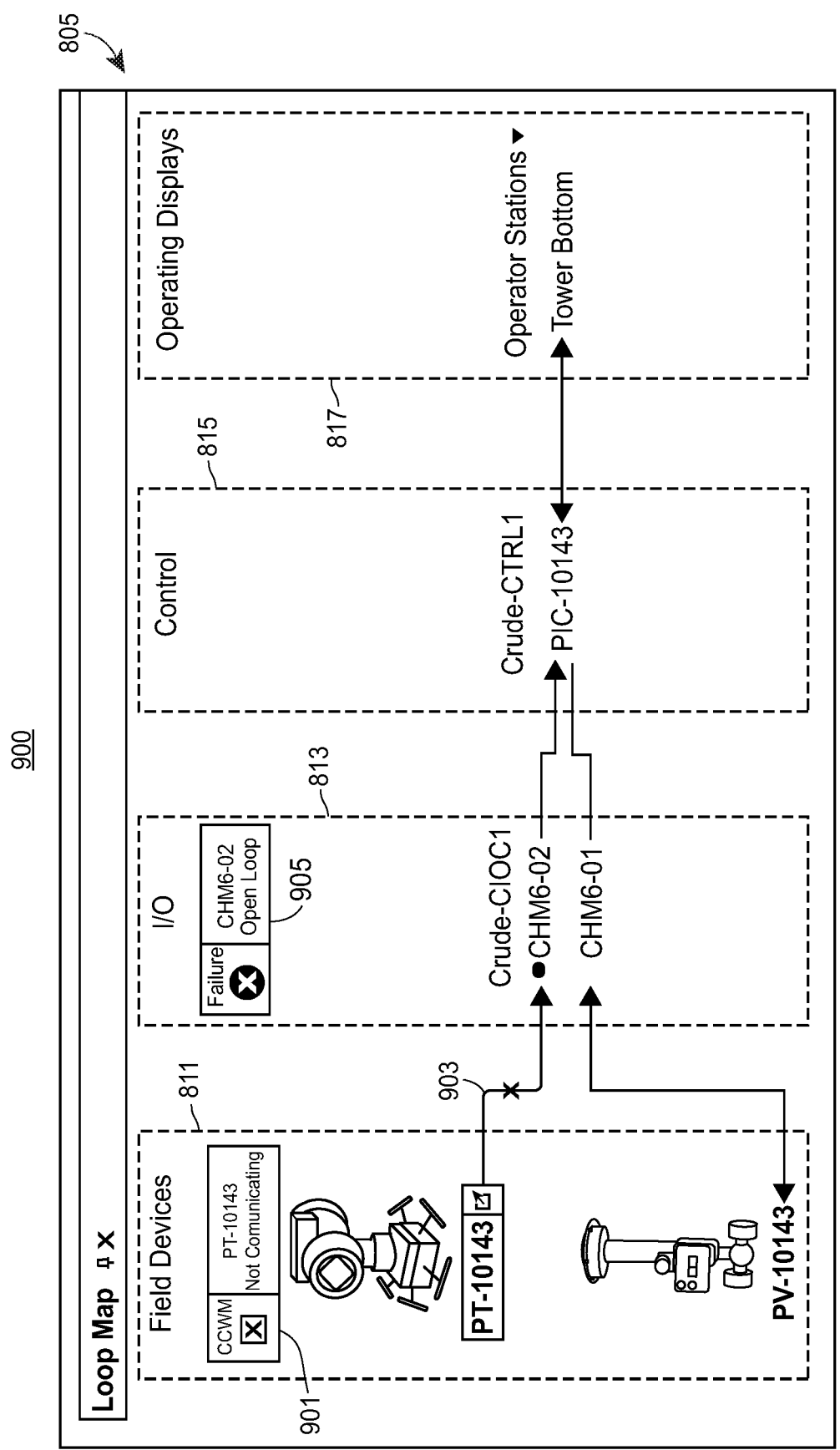
FIG. 9 depicts an example display including a loop map after the loop map has been updated to display associated statuses according to an embodiment.

FIG. 9 depicts an example display 900 including the loop map 805 after the loop map 805 has been updated to display associated statuses according to an embodiment. As shown in FIG. 9, the loop map 805 includes statuses 901-905. The status 901 indicates that a pressure transmitter PT-10143 is not communicating. Similarly, the status 903 indicates a failed communication link between the pressure transmitter PT-10143 and the I/O devices CHM6-02. Finally, the status 905 indicates that an open loop exists due to the lack of feedback from the pressure transmitter PT-10143.

Figure 10:
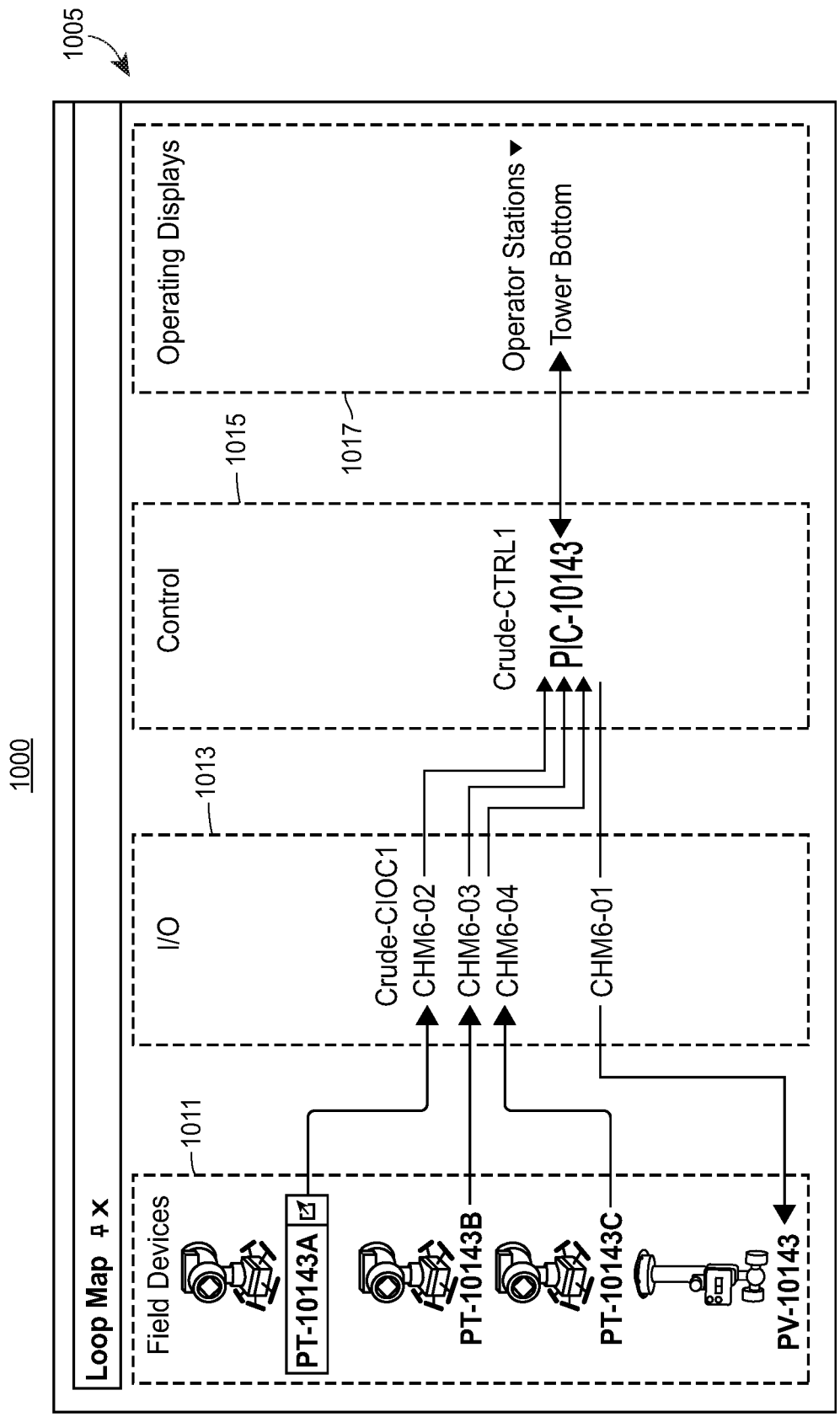
FIG. 10 depicts an example display including a loop map according to an embodiment.

FIG. 10 depicts an example display 1000 including a loop map 1005 according to an embodiment. The loop map 1005 depicts field devices 1011, I/O devices 1013, a controller 1015, and an operator display 1017.

Figure 11:
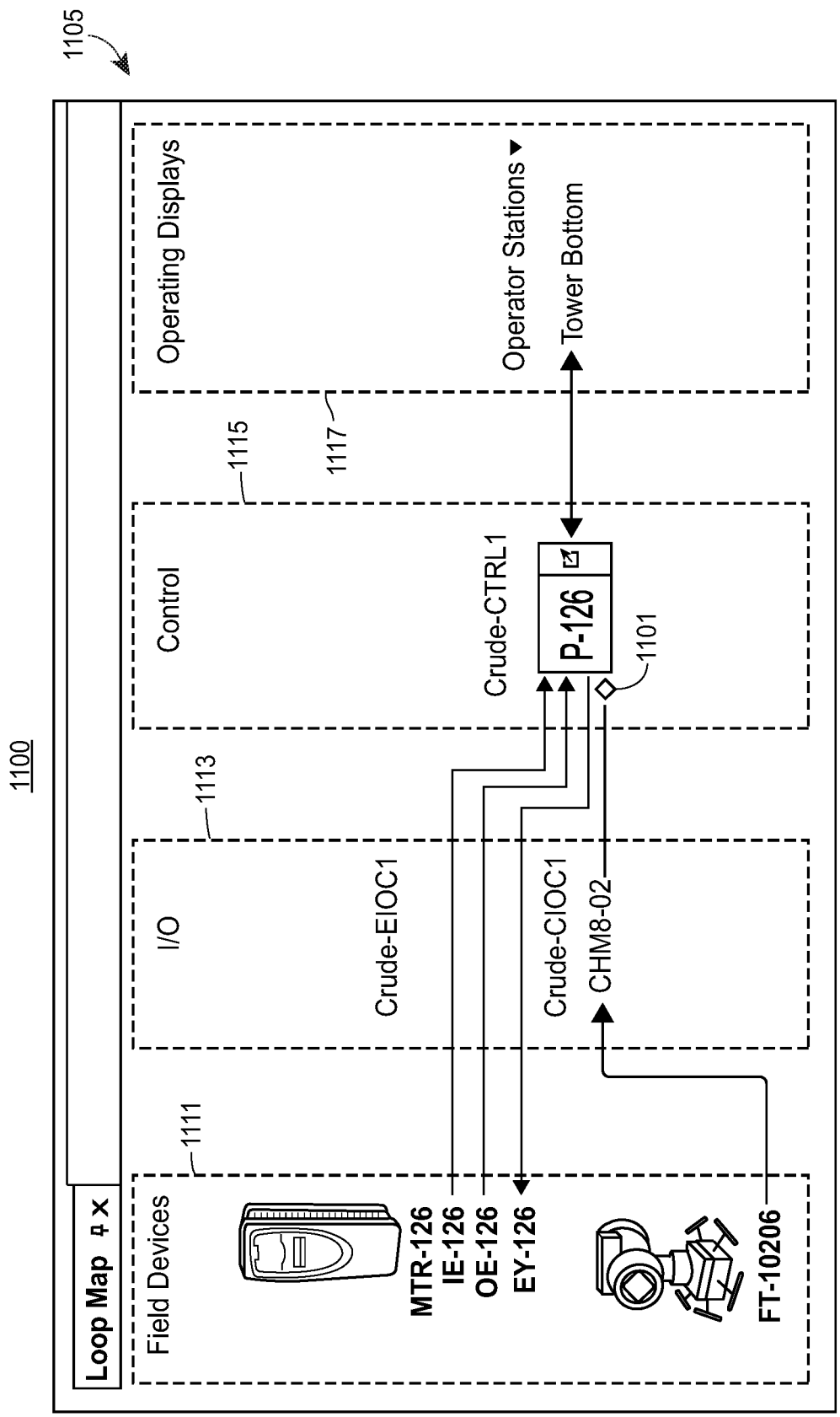
FIG. 11 depicts an example display including a loop map depicting field devices including a motor and a flow transmitter according to an embodiment.

FIG. 11 depicts an example display 1100 including a loop map 1105 according to an embodiment. The loop map 1105 depicts field devices 1111, I/O devices 1113, a controller 1115, and an operator display 1117. The field devices 1111 include a motor (MTR-126) and a flow transmitter (FT-10208). The I/O devices 1113 include an I/O device (CHM8-02) connected to the flow transmitter. As shown by the loop map 1105, a field device (i.e., the MTR-126 in this case) may communicate directly with a controller. The display 1100 depicts a status 1101 for a communication link between an I/O device (CHM8-02) and the controller 1115.

VI. Additional Considerations

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This description, and the claims that follow, should be read to include one or at least one. The singular also includes the plural unless it is obvious that it is meant otherwise.

Throughout this specification, some of the following terms are used.

Communication Link. A "communication link" or "link" is a pathway or medium connecting two or more nodes. A link may be a physical link and/or a logical link. A physical link is the interface and/or medium(s) over which information is transferred, and may be wired or wireless in nature. Examples of physicals links may include a cable with a conductor for transmission of electrical energy, a fiber optic connection for transmission of light, and/or a wireless electromagnetic signal that carries information via changes made to one or more properties of an electromagnetic wave(s).

A logical link between two or more nodes represents an abstraction of the underlying physical links and/or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

The controller may store and implement one or more software elements (e.g., function blocks) defining a control routine that causes the controller to send control signals to the water inlet valve based on the received level measurement. For example, the software elements may be configured to cause the controller to send a control signal to open the valve when the water measurement level drops below a certain threshold.

Memory and Computer-Readable Media. Generally speaking, as used herein the phrase "memory" or "memory device" refers to a system or device including computer-readable media ("CRM"). "CRM" refers to a medium or media accessible by the relevant computing system for placing, keeping, and/or retrieving information (e.g., data, computer-readable instructions, program modules, applications, routines, etc.). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile and/or nonvolatile media, and removable and/or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network. As used herein and unless otherwise specified, when used in the context of system(s) or device(s) that communicate information or data, the term "network" refers to a collection of nodes (e.g., devices or systems capable of sending, receiving and/or forwarding information) and links which are connected to enable telecommunication between the nodes.

A network may include dedicated routers responsible for directing traffic between nodes, and, optionally, dedicated devices responsible for configuring and managing the network. Some or all of the nodes may be also adapted to function as routers in order to direct traffic sent between other network devices. Network devices may be interconnected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiber optic cable, for example, may be capable of providing a bandwidth several orders of magnitude higher than a wireless link because of the difference in the inherent physical limitations of the medium. A network may include networks or sub-networks, such as a local area network (LAN) or a wide area network (WAN).

Node. Generally speaking, the term "node" refers to a connection point, redistribution point, or a communication endpoint. A node may be any device or system (e.g., a computer system) capable of sending, receiving and/or forwarding information. For example, end-devices or end-systems that originate and/or ultimately receive a message are nodes. Intermediary devices that receive and forward the message (e.g., between two end-devices) are also generally considered to be "nodes."

Processor. The various operations of example methods described herein may be performed, at least partially, by one or more processors. Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller and/or an I/O controller. A chipset is a collection of electronic components in an integrated circuit that is typically configured to provide I/O and memory management functions as well as a plurality of general purpose and/or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

System Bus. Generally speaking, a processor or a particular system or subsystem may communicate with other components of the system or subsystem via one or more communication links. When communicating with components in a shared housing, for example, the processor may be communicatively connected to components by a system bus. Unless stated otherwise, as used herein the phrase "system bus" refers to: a data bus (for carrying data), an address bus (for determining where the data should be sent), a control bus (for determining the operation to execute), or some combination thereof. Further, "system bus" may refer to any of several types of bus structures including a memory bus or memory controller, a peripheral bus, or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

What is claimed is:

1. A method comprising:
    displaying, at a display, a loop map for a plurality of control loops of a process plant, the loop map depicting a first plurality of control loop elements of a first control loop and a second plurality of control loop elements of a second control loop, wherein:
        (i) at least one of the first plurality of control loop elements is included in the second plurality of control loop elements; and
        (ii) the loop map depicts: (a) one or more control routines for controlling one or more of the first and second control loops, (b) one or more processor controllers implementing the one or more control routines, and (c) one or more communication links between the one or more process controller and one or more field devices included in one or more of the first and second control loops;
    displaying, at the display, a control loop status associated with the loop map;
    modifying one of the plurality of control loops based on a user interaction with one or more of: (i) the displayed control loop, or (ii) the control loop status; and
    controlling the process based, at least in part, utilizing the plurality of control loops.

2. The method of claim 1, wherein the depicted plurality of control loop elements comprises: a plurality of hardware elements of the control loop.

3. The method of claim 2, wherein the depicted plurality of hardware elements comprises: a plurality of devices of the control loop and a communication link between at least two of the plurality of devices.

4. The method of claim 3, wherein the depicted plurality of devices comprises:
    (i) a field device;
    (ii) an I/O device;
    (iii) a first communication link between the field device and the I/O device;
    (iv) a controller configured to transmit a control signal for controlling the field device or receive a measurement obtained by the field device;
    (v) a second communication link between the controller and the I/O device;
    (vi) an operator station configured to monitor or control the field device; and
    (vii) a third communication link between the operator station and the controller.

5. The method of claim 4, wherein the depicted plurality of control loop elements further comprises: a control routine implemented by the controller.

6. The method of claim 3, wherein the control loop status is a status for (i) one of the plurality of devices, or (ii) the communication link.

7. The method of claim 1, wherein the depicted plurality of control loop elements comprises: a plurality of software elements of the control loop.

8. The method of claim 7, wherein the depicted plurality of software elements comprises a plurality of function blocks;
    wherein the plurality of function blocks includes: an input function block, a control function block, or an output function block.

9. The method of claim 1, further comprising receiving a user request to view the loop map prior to displaying the loop map.

10. The method of claim 9, wherein the control loop status is displayed before the user request is received.

11. The method of claim 1, further comprising:
    receiving user input representing a user selection of the displayed control loop status; and
    highlighting a control loop element from the depicted plurality of control loop elements that corresponds to the user selection of the displayed control loop status.

12. The method of claim 1, wherein the displayed control loop status is an unusual condition, wherein the method further comprises displaying a corrective action to remedy the unusual condition.

13. A loop map system comprising:
    one or more memory devices storing:
        (i) a loop map for a plurality of control loops of a process plant, the loop map depicting a first plurality of control loop elements of a first control loop and a second plurality of control loop elements of a second control loop, wherein:
            (i) at least one of the first plurality of control loop elements is included in the second plurality of control loop elements; and
            (ii) the loop map depicts: (a) one or more control routines for controlling one or more of the first and second control loops, (b) one or more processor controllers implementing the one or more control routines, and (c) one or more communication links between the one or more process controller and one or more field devices included in one or more of the first and second control loops;
(ii) a record of statuses associated with the plurality of control loop elements;
a processor communicatively coupled to the memory;
a display communicatively coupled to the processor;
one or more routines stored to the one or more memory devices that, when executed by the processor, causes the loop map system to:
(i) designate a status from the record of statuses as a control loop status; and
(ii) display via the display: (a) the loop map depicting the plurality of control loop elements, and (b) the control loop status;
(iii) modify one of the plurality of control loops based on a user interaction with one or more of: (i) the displayed control loop, or (ii) the control loop status; and
(iv) control the process based, at least in part, utilizing the plurality of control loops.

14. The loop map system of claim 13, wherein the depicted plurality of control loop elements comprises: a plurality of hardware elements of the control loop.

15. The loop map system of claim 14, wherein the depicted plurality of hardware elements comprises: a plurality of devices of the control loop and a communication link between at least two of the plurality of devices.

16. The loop map system of claim 15, wherein the depicted plurality of devices comprises:
(i) a field device;
(ii) an I/O device;
(iii) a first communication link between the field device and the I/O device;
(iv) a controller configured to transmit a control signal for controlling the field device or receive a measurement obtained by the field device;
(v) a second communication link between the controller and the I/O device;
(vi) an operator station configured to monitor or control the field device; and
(vii) a third communication link between the operator station and the controller.

17. The loop map system of claim 16, wherein the depicted plurality of control loop elements further comprises: a control routine implemented by the controller.

18. The loop map system of claim 15, wherein the control loop status is a status for (i) one of the plurality of devices, or (ii) the communication link.

19. The loop map system of claim 13, wherein the depicted plurality of control loop elements comprises: a plurality of software elements of the control loop.

20. The loop map system of claim 19, wherein the depicted plurality of software elements comprises a plurality of function blocks;
wherein the plurality of function blocks includes: an input function block, a control function block, or an output function block.

21. The loop map system of claim 13, further comprising a third routine stored to the memory that, when executed by the processor, causes the loop map system to receive via a user input interface a user request to view the loop map prior to displaying the loop map.

22. The loop map system of claim 21, wherein the second routine causes the loop map system to display the control loop status before the user request is received.

23. The loop map system of claim 13, further comprising:
a third routine stored to the one or more memory devices that, when executed by the processor, causes the loop map system to receive user input representing a user selection of the displayed control loop status; and
a fourth routine stored to the one or more memory devices that, when executed by the processor, causes the loop map system to highlight a control loop element from the depicted plurality of control loop elements that corresponds to the displayed control loop status.

24. The loop map system of claim 13, wherein the displayed control loop status is an unusual condition, wherein the method further comprises displaying a corrective action to remedy the unusual condition.

* * * * *